US 12,047,484 B2

(12) United States Patent
Leplus et al.

(10) Patent No.: US 12,047,484 B2
(45) Date of Patent: Jul. 23, 2024

(54) METHOD FOR EXECUTING A FUNCTION, SECURED BY TEMPORAL DESYNCHRONIZATION

(71) Applicant: Commissariat à l'Energie Atomique et aux Energies Alternatives, Paris (FR)

(72) Inventors: Gaëtan Leplus, Grenoble (FR); Olivier Savry, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 266 days.

(21) Appl. No.: 17/654,477

(22) Filed: Mar. 11, 2022

(65) Prior Publication Data
US 2022/0360424 A1 Nov. 10, 2022

(30) Foreign Application Priority Data

May 7, 2021 (FR) ..................................... 21 04828

(51) Int. Cl.
*H04L 9/00* (2022.01)
(52) U.S. Cl.
CPC .......... *H04L 9/002* (2013.01); *H04L 2209/08* (2013.01)
(58) Field of Classification Search
CPC .. G06F 9/30069; H04L 9/002; H04L 2209/08
See application file for complete search history.

(56) References Cited

U.S. PATENT DOCUMENTS

| 7,412,608 | B2 | 8/2008 | May | |
| 8,312,297 | B2 * | 11/2012 | Sato | .................. G06F 21/14 |
| | | | | 726/22 |
| 8,782,435 | B1 * | 7/2014 | Ghose | .................. H04L 9/3247 |
| | | | | 712/216 |
| 11,327,765 | B2 * | 5/2022 | Liu | .................. G06F 9/3836 |
| 11,418,339 | B2 * | 8/2022 | Tang | .................. H04L 9/16 |
| 11,748,108 | B2 * | 9/2023 | Xu | .................. G06F 9/30087 |
| | | | | 712/216 |

(Continued)

FOREIGN PATENT DOCUMENTS

| CN | 103324467 A | 9/2013 |
| WO | WO 2020/021176 A1 | 1/2020 |

OTHER PUBLICATIONS

French Preliminary Search Report issued Dec. 6, 2021 in French Application 21 04828 filed on May 7, 2021, 10 pages (with English Translation of Categories of Cited Documents & Written Opinion).

(Continued)

*Primary Examiner* — Lizbeth Torres-Diaz
(74) *Attorney, Agent, or Firm* — Oblon, McClelland, Maier & Neustadt, L.L.P.

(57) ABSTRACT

A method for executing a function, secured by temporal desynchronization, includes when a first legitimate instruction is loaded, noting the opcode of this first legitimate instruction, then constructing a dummy instruction on the basis of this noted opcode, the dummy instruction thus constructed being identical to the first legitimate instruction except that its operands are different, then incorporating the dummy instruction thus constructed into a sequence of dummy instructions used to delay the time at which a second legitimate instruction is executed.

7 Claims, 3 Drawing Sheets

(56) References Cited

U.S. PATENT DOCUMENTS

| | | |
|---|---|---|
| 2003/0110390 A1 | 6/2003 | May |
| 2008/0148066 A1* | 6/2008 | Hazra .................... G06F 21/56 |
| | | 705/51 |
| 2009/0077383 A1* | 3/2009 | de Monseignat ..... H04L 9/3242 |
| | | 713/176 |
| 2011/0258423 A1 | 10/2011 | Hoogerbrugge |
| 2014/0059326 A1* | 2/2014 | Sakashita ............ G06F 9/30003 |
| | | 712/208 |
| 2016/0211977 A1* | 7/2016 | Kohiyama ............... G09C 1/00 |
| 2021/0089306 A1* | 3/2021 | Liu ......................... G06F 9/324 |
| 2022/0067155 A1* | 3/2022 | Favor .................. G06F 9/30101 |

OTHER PUBLICATIONS

He et al., "A SCA-resistant Processor Architecture Based on Random Delay Insertion", 2015 International Conference on Computing and Communications Technologies, IEEE, 2015, 4 pages.

\* cited by examiner

METHOD FOR EXECUTING A FUNCTION, SECURED BY TEMPORAL DESYNCHRONIZATION

The invention relates to a method for executing a function, secured by temporal desynchronization. It also relates to a microprocessor for implementing this method.

Temporal desynchronization is an approach employed in software or hardware countermeasures to make more difficult attempts at cryptanalysis of a function executed, for example, by a microprocessor of an on-board system. Below, this executed function is called a "secure function" because it is generally a function, such as, for example, an encryption or decryption function, that executes operations that are the privileged target of attackers.

Cryptanalysis of a function in particular consists in studying the operation of this function in order to reveal secret information processed by this function, or to modify its operation. Attempts at cryptanalysis are conventionally called "attacks".

Temporal desynchronization is, for example, an effective way of making side-channel attacks more difficult. Side-channel attacks encompass a wide variety of different possible attacks. For example, certain of these attacks consist in measuring a physical quantity correlated with the operations executed by the microprocessor when it is executing the secure function. This physical quantity may be the electrical power consumption of the microprocessor, the electromagnetic radiation of the microprocessor, the noise of the microprocessor, execution time, inter alia. In the case where the physical quantity is the electrical power consumption of the microprocessor, this attack is known by the acronym DPA ("Differential Power Analysis") or CPA ("Correlation Power Analysis"). These attacks aim to correlate an external event, such as the measurement of a physical quantity, with the time at which a particular instruction of the secure function is executed. Temporal-desynchronization techniques aim to make it more difficult to establish this correlation between external events and the execution of certain particular instructions.

Another known attack is, for example, the fault injection attack. This attack consists in causing a fault or a malfunction of the microprocessor at the particular time at which it executes a critical instruction of the secure function. A critical instruction is, for example, a conditional branch instruction, in order to cause an unexpected operation of this secure function. In the context of this type of attacks, temporal desynchronization increases how difficult it is for an attacker to target with fault injection the time at which a particular instruction of the secure function is executed.

These attacks have in common that it is necessary to correlate an external event, such as a measurement of electrical power consumption or the injection of a fault, with the time at which a particular instruction of the secure function is executed. Temporal-desynchronization techniques aim to make it more difficult to establish this correlation between external events and the execution of certain particular instructions. To this end, it has already been proposed to introduce a random delay before the execution of certain instructions of the secure function. By virtue of these known methods, the time at which a particular instruction of a secure function is executed varies randomly from one execution of this secure function to the next.

To introduce this random delay, it has already been proposed to execute, at randomly chosen times, a sequence of dummy instructions. A sequence of dummy instructions is a sequence of instructions that in no way modifies the result produced by the secure function when this sequence is executed by the microprocessor. For example, patent application CN103324467A describes such a method.

The difficulty is how to construct sequences of dummy instructions that are not easily discoverable by an attacker. To do this, patent application CN103324467A proposes to randomly draw each dummy instruction. In particular, the opcode of each dummy instruction is randomly drawn from a group of predetermined opcodes usable to construct a dummy instruction. Randomly drawing the opcode of the dummy instruction slows the construction of this dummy instruction.

Prior art is also known from U.S. Pat. No. 7,412,608B2 and US2011258423A1.

The invention aims to provide a method for executing a function, secured by temporal desynchronization, that is more robust against attacks and in which construction of the dummy instructions is faster. Therefore, one subject thereof is such an executing method.

Another subject of the invention is a microprocessor for implementing this executing method.

The invention will be better understood on reading the following description, which is given solely by way of non-limiting example, with reference to the drawings, in which.

SECTION I: TERMINOLOGIES AND NOTATIONS

Figure 1:
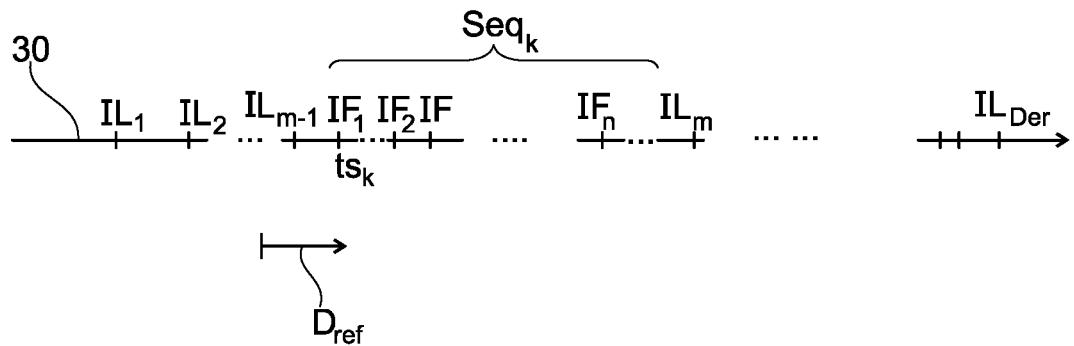
FIG. 1 is a schematic illustration, along an axis, of various times at which instructions of a secure function are executed.

In these figures, the same reference numbers have been used to designate elements that are the same. Hereinafter in this description, features and functions that are well known to those skilled in the art are not described in detail.

In this description, the following definitions have been adopted.

A "program" designates a set of one or more predetermined functions that it is desired to have executed by a microprocessor.

A "source code" is a representation of the program in a computer language, not being able to be executed directly by a microprocessor and being intended to be converted, by a compiler, into a machine code able to be executed directly by the microprocessor.

A program or a code is said to be "able to be executed directly" or "directly executable" when it is able to be executed by a microprocessor without this microprocessor needing to compile it beforehand by way of a compiler or to interpret it beforehand by way of an interpreter.

An "instruction" designates a machine instruction able to be executed by a microprocessor. Such an instruction consists:

of an opcode, or operation code, that codes the nature of the operation to be executed, and of one or more operands defining the one or more values of the parameters of this operation.

A "machine code" is a set of machine instructions. It is typically a file containing a sequence of bits with the value "0" or "1", these bits coding the instructions to be executed by the microprocessor. The machine code is able to be executed directly by the microprocessor, that is to say without the need for a preliminary compilation or interpretation. The machine code comprises a succession of instructions organized one after another and that forms an ordered sequence of instructions in the machine code.

A "binary code" is a file containing a sequence of bits with the value "0" or "1". These bits code data and instructions to be executed by the microprocessor. The binary code thus comprises at least one machine code and also, in general, digital data processed by this machine code.

A "legitimate instruction" is an instruction that influences the result produced by the secure function when it is executed by a microprocessor. Typically, the execution of a legitimate instruction modifies the result produced by the secure function. In other words, if the execution of a legitimate instruction is omitted, the result produced by the secure function is not the same as when this legitimate instruction is executed. The result of a secure function may be of any nature. For example, it may be a question of numerical values, of signals used to control an electronic apparatus, inter alia. The legitimate instructions necessarily form part of the machine code generated by compiling the source code of the secure function.

In contrast, a "dummy instruction" is an instruction that does not influence the result produced by the secure function when it is executed by the microprocessor. Thus, the execution of a dummy instruction does not modify the result produced by the secure function. In other words, if the execution of a dummy instruction is omitted, the result produced by the secure function is systematically the same as when this dummy instruction is executed. The dummy instructions do not necessarily form part of the machine code generated during the compilation of the source code of the secure function.

FIG. 1 is used to introduce various notations that are then used in this text. FIG. 1 shows a time axis 30 on which each graduation corresponds to a time at which a legitimate instruction $IL_m$ of a secure function is executed. The index "m" is the order number of the legitimate instruction with respect to the other executed legitimate instructions of the secure function. Here, this order number "m" is assigned by taking as origin the first executed legitimate instruction $IL_1$ of the secure function and by proceeding in a reference direction $D_{ref}$. Thus, starting from the instruction $IL_1$ and proceeding in the direction $D_{ref}$, the second legitimate instruction encountered is the instruction $IL_2$ and so on until the last legitimate instruction $IL_{Der}$ of the secure function encountered proceeding in the direction $D_{ref}$. Here, the direction $D_{ref}$ corresponds to the direction in which the instructions $IL_m$ are temporally executed one after another by an electronic microprocessor. It will also be noted that the order in which the instructions $IL_m$ are executed may depend on the values of the variables processed by the secure function. Thus, the value of the index "m" associated with an executed legitimate instruction may vary depending on the values of the processed variables. Below, to simplify the explanations and because this corresponds to the worst-case scenario, the values of the variables processed on each execution of the secure function are considered to remain constant so that the value of the index "m" associated with a given instruction is always the same. In the contrary case where the values of the processed variables change and cause a modification of the order of execution of the legitimate instructions, this further increases the temporal desynchronization.

Below, unless otherwise indicated, terms such as "preceding legitimate instruction", "following legitimate instruction", "before", and "after", are defined with respect to the direction $D_{ref}$. Thus, the legitimate instruction immediately preceding the instruction $IL_m$ is the instruction $IL_{m-1}$.

Lastly, during the execution of the secure function, one or more sequences $Seq_k$ of dummy instructions are inserted. A sequence $Seq_k$ is a group of one or more dummy instructions $IF_n$ that are systematically executed one after another. The index "n" is the order number of the dummy instruction $IF_n$ inside the sequence $Seq_k$. The sequences $Seq_k$ are separate from one another. Thus, there is a least one legitimate instruction between two consecutive sequences $Seq_k$ and $Seq_{k+1}$.

The index k is the order number of the sequence $Seq_k$ with respect to the other sequences of inserted dummy instructions. This order number is assigned by taking as origin the sequence $Seq_1$ and by proceeding in the direction $D_{ref}$. Thus, starting from the instruction $IL_1$ and proceeding in the direction $D_{ref}$, the first sequence of dummy instructions encountered is the sequence $Seq_1$, the second sequence of dummy instructions encountered is the sequence $Seq_2$ and so on.

Section II: Examples of Embodiments

Figure 2:
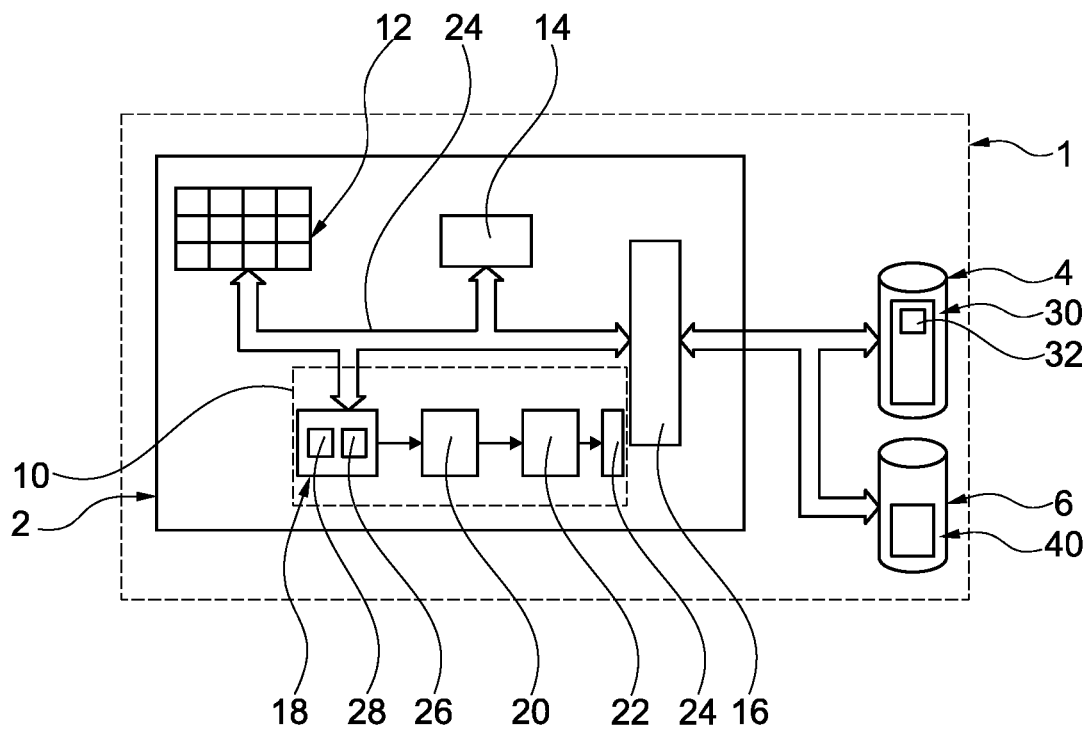
FIG. 2 is a schematic illustration of the structure of an electronic apparatus able to execute a secure function.

FIG. 2 shows an electronic apparatus 1 comprising a microprocessor 2, a main memory 4 and a mass storage medium 6. For example, the apparatus 1 is a computer, a smartphone, an electronic tablet, a chip card or the like. To simplify FIG. 2, the other components of the apparatus 1 have not been shown. Typically, the apparatus 1 notably comprises in addition:

a clock that sets the rate of operation of the microprocessor 2, and a power supply that supplies the power required by the apparatus 1 to operate.

The microprocessor 2 here comprises:

a hardware pipeline 10 for processing the instructions to be executed;

a set 12 of registers;

a control module 14; and a data input/output interface 16.

The memory 4 is configured to store instructions of a binary code 30 of a program to be executed by the microprocessor 2. This program notably comprises the machine code of a secure function to be executed.

The secure function is typically a function that manipulates and/or processes secret information during its execution. For example, the secure function is an encryption or decryption function. In the case of encryption or decryption functions, the secret information often corresponds to an encryption or decryption key. For example, here, the secure function is an AES ("Advanced Encryption Standard") encryption function. The secure function comprises a succession of legitimate instructions that codes the operations carried out by the microprocessor 2 when it executes this secure function.

The memory 4 is a random-access memory. The memory 4 is typically a volatile memory. The memory 4 may be a memory external to the microprocessor 2, as shown in FIG.

1. In this case, the memory 4 is, for example, formed on a substrate that is mechanically separate from the substrate on which the various elements of the microprocessor 2, such as the pipeline 10, are formed.

In this example of embodiment, the binary code 30 notably comprises a machine code 32 of the secure function.

By way of illustration, the microprocessor 2 is a reduced instruction set computer (RISC) that for example implements an instruction set according to RISC-V. An instruction set defines in a limiting way the syntaxes possible for the instructions that the microprocessor 2 is capable of executing. This instruction set therefore notably defines all of the opcodes possible for an instruction. The syntax of an instruction is incorrect if its syntax corresponds to none of the syntaxes possible for an instruction executable by the microprocessor 2.

The pipeline 10 allows execution of an instruction of the machine code to be started while processing, by the pipeline 10, of the previous instruction of this machine code has not yet ended. Such processing pipelines are well-known and only elements of the pipeline 10 that are required to understand the invention will be described in more detail.

The pipeline 10 typically comprises the following stages:
an instruction loader 18,
an instruction decoder 20,
an arithmetic logic unit 22 that executes the instructions, and
a module 24 for writing to memory.

The loader 18 loads the next instruction to be executed by the unit 22 from the memory 4. More precisely, the loader 18 loads the instruction of the machine code 32 to which a program counter 26 points. Unless its value is modified by executing a branch instruction, the value of the program counter 26 is incremented by a unit step on each clock cycle of the microprocessor. The unit step is equal to the difference between the addresses of two immediately consecutive instructions in the machine code 32.

The decoder 20 decodes the instruction loaded by the loader 18 to obtain configuration signals that configure the microprocessor 2 so that it executes, in the next clock cycle, the loaded instruction. One of these configuration signals codes the nature of the operation to be executed by the unit 22. This configuration signal corresponds to the opcode of the loaded instruction. Other configuration signals indicate, for example, whether the loaded instruction is an instruction to load a datum from the memory 4 or to write a datum to the memory 4. These configuration signals are transmitted to the unit 22. Other configuration signals comprise the values of the loaded operands. Depending on the instruction to be executed, configuration signals are also transmitted to the set 12 of registers or to the unit 22.

When the decoder 20 is unable to decode an instruction, it generates an error signal or it generates an NOP instruction (NOP being the acronym of "No-OPeration"). Typically, this occurs if the syntax of the loaded instruction is incorrect. When the unit 22 executes a NOP instruction, no operation is performed thereby.

The unit 22 executes the loaded instructions one after another. The unit 22 is also capable of storing the result of these executed instructions in one or more of the registers of the set 12.

In this description, "execution by the microprocessor 2" and "execution by the unit 22" will be used synonymously.

The module 24 writes to the memory 4 the result of a computation of the unit 22 or the content of a register of the set 12.

A given instruction of the machine code must successively be processed, in order, by the loader 18, the decoder 20 and the unit 22. In addition, the loader 18, the decoder 20 and the unit 22 are capable of working in parallel with one another. Thus, at a given time, the loader 18 may be in the process of loading the following instruction, the decoder 20 in the process of decoding the current instruction and the unit 22 in the process of executing the previous instruction. The pipeline 10 thus allows at least three instructions of the machine code 30 to be processed in parallel.

In addition, in this embodiment, the loader 18 comprises a hardware temporal-desynchronization module 28. The module 28 is capable of producing temporal variability on each execution of the secure function. To do this, the module 28 introduces a random delay before the execution of certain instructions $IL_m$ of the secure function. To introduce a delay, the module 28 inserts a sequence $Seq_k$ of dummy instructions between the instructions $IL_m$ and $IL_{m-1}$. An example of embodiment of the module 28 is described in more detail with reference to FIG. 3.

In this example of embodiment, the set 12 comprises general registers that are usable to store any type of data, and dedicated registers. In contrast to the general registers, the dedicated registers are dedicated to storing particular data that are generally automatically generated by the microprocessor 2.

The module 14 is configured to move data between the set 12 of registers and the interface 16. The interface 16 is notably able to acquire data and instructions, for example from the memory 4 and/or the medium 6.

The microprocessor 2 here comprises a bus 24 that links the various components of the microprocessor 2 to one another.

The medium 6 is typically a non-volatile memory. It is for example an EEPROM or flash memory. Here, it contains a backup copy 40 of the binary code 30. It is typically this copy 40 that is automatically copied to the memory 4 to restore the code 30, for example after a power failure or the like or just before the execution of the code 30 starts.

Figure 3:
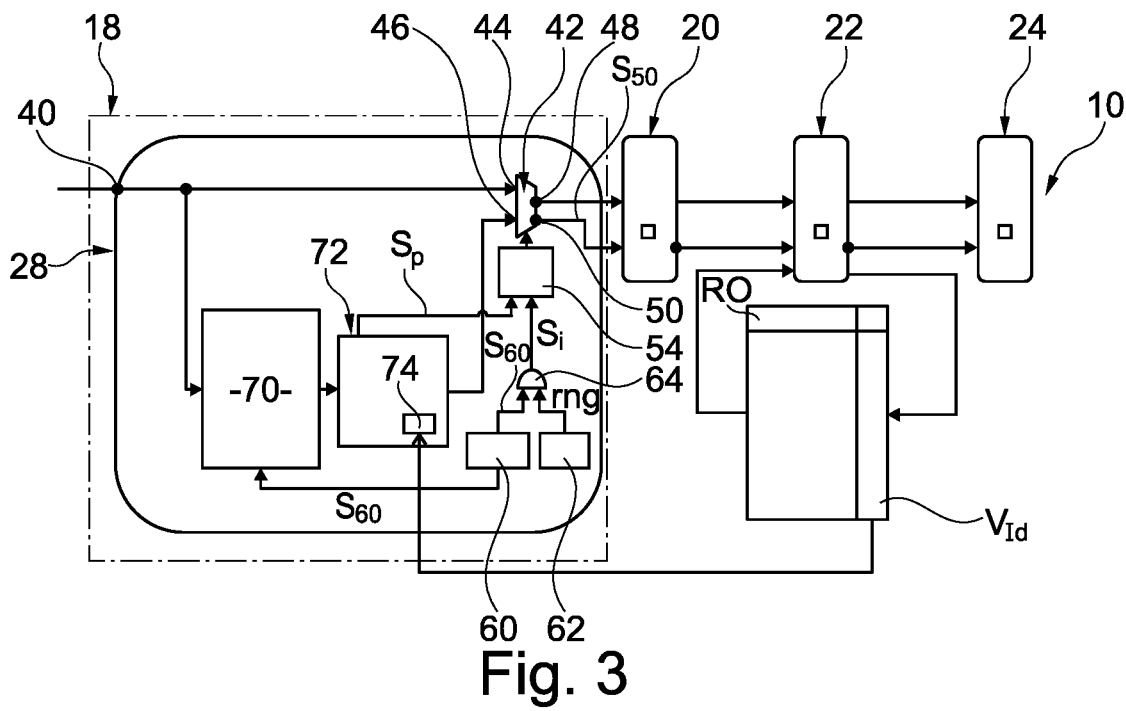
FIG. 3 is a schematic illustration of a temporal-desynchronization module implemented in the apparatus of FIG. 2.

FIG. 3 shows the temporal-desynchronization module 28 in more detail. The module 28 comprises:
an input 40 that receives the legitimate instructions loaded one after another, and
a multiplexer 42 that comprises an input 44 connected to the input 40.

The multiplexer 42 also comprises an input 46, and an output 48 that delivers the legitimate instruction received on the input 40 or, alternatively, a dummy instruction received on the input 46. The output 48 of the multiplexer 42 is connected to the input of the decoder 20.

The multiplexer 42 also comprises an output 50 connected to the decoder 20, to the unit 22 and to the module 24. The multiplexer 42 delivers on this output 50 a signal identifying a dummy instruction when the input 46 is selected. Here, the multiplexer 42 delivers, on the output 50, the Boolean value "1" when it delivers on its output 48 a dummy instruction and the value "0" otherwise.

The multiplexer 42 is controlled by a control circuit 54. The circuit 54 controls the multiplexer 42 to select the input 46 when said circuit receives a signal $S_i$ equal to "1". When it is equal to "1", the signal $S_i$ triggers insertion of a new sequence $Seq_k$ of dummy instructions. The value "0" of the signal $S_i$ inhibits triggering of insertion of a new sequence $Seq_k$. The circuit 54 thus keeps the input 46 selected as long as it receives a signal $S_p$ equal to "1". The value "1" of the signal $S_p$ indicates that the sequence $Seq_k$ is in the process of being inserted. The value "0" of the signal $S_p$ in contrast indicates that there is no sequence $Seq_k$ in the process of being inserted.

To generate the signal $S_i$, the module 28 comprises:
- a clock divider 60 that generates a clock signal $S_{60}$ the frequency of which is equal to $2F_i$,
- a generator 62 of a Boolean random number denoted "rng", and
- a gate 64 that carries out the "AND" logic operation on the signal $S_{60}$ and the value of the number rng and delivers, on its output, by way of signal $S_i$, the result of this logic operation.

The divider 60 divides the clock frequency of the microprocessor 2 to obtain a clock signal $S_{60}$ the frequency of which is equal to $2F_i$. The frequency $F_i$ is a predetermined value here stored in an internal register of the microprocessor 2. For example, this particular internal register is the control and status register (CSR) of the microprocessor 2 in the case of an RISC-V architecture. This signal 60 is here a rectangular signal that passes from the value "0" to the value "1" after each period of duration $1/(2F_i)$.

The generator 62 makes the value of the number rng randomly vary between "0" and "1" with a frequency higher than or equal to $2F_i$. Here, the probabilities of the values "0" and "1" of the number rng are equal. Thus, on average, the frequency at which the signal $S_i$ passes from "0" to "1" is equal to the frequency $F_i$.

To generate a sequence $Seq_k$ of dummy instructions, the module 28 comprises:
- a memory 70, and
- a constructor 72 of sequences of dummy instructions.

The memory 70 is a memory capable of storing a block of K opcodes of successive legitimate instructions, where K is an integer number higher than or equal to one, five or ten. To do this, the memory 70 is connected to the input 40 on which are received the loaded legitimate instructions.

Here, storage of a block of K opcodes of legitimate instructions is triggered at the frequency $2F_i$. To do this, the memory 70 receives the signal $S_{60}$ generated by the divider 60.

The constructor 72 constructs each sequence $Seq_k$ on the basis of the block of opcodes stored in the memory 70 and depending on two numbers $Nb_L$ and $Nb_i$. The number $Nb_L$ is a number of loops. The parameter $Nb_i$ is a number of dummy instructions per loop. The number $Nb_i$ is lower than or equal to K and higher than or equal to one.

The values of the numbers $Nb_L$ and $Nb_i$ are stored in an internal register of the microprocessor 2. Here, it is a question of an internal register of the microprocessor 2 that is able to be written to and read from using instructions executed by the unit 22. For example, the values of these numbers $Nb_L$ and $Nb_i$ are stored in the same CSR as used to store the value of the frequency $F_i$. For example, this CSR is a 32-bit register. The first 20 bits of this register are then used to store the value of the frequency $F_i$, then the following 6 bits are used to store the value of the number $Nb_L$ and the following 6 bits are used to store the value of the number $Nb_i$.

Here, the sequence $Seq_k$ constructed by the constructor 72 comprises a subsequence of $Nb_i$ dummy instructions repeated $Nb_L$ times. Thus, the numbers $Nb_L$ and $Nb_i$ allow the number of dummy instructions contained in the sequence $Seq_k$ to be adjusted. They therefore allow the approximate duration of the delay introduced when this sequence $Seq_k$ is executed by the unit 22 between the execution of the instructions $IL_{m-1}$ and $IL_m$ to be adjusted.

Figure 6:
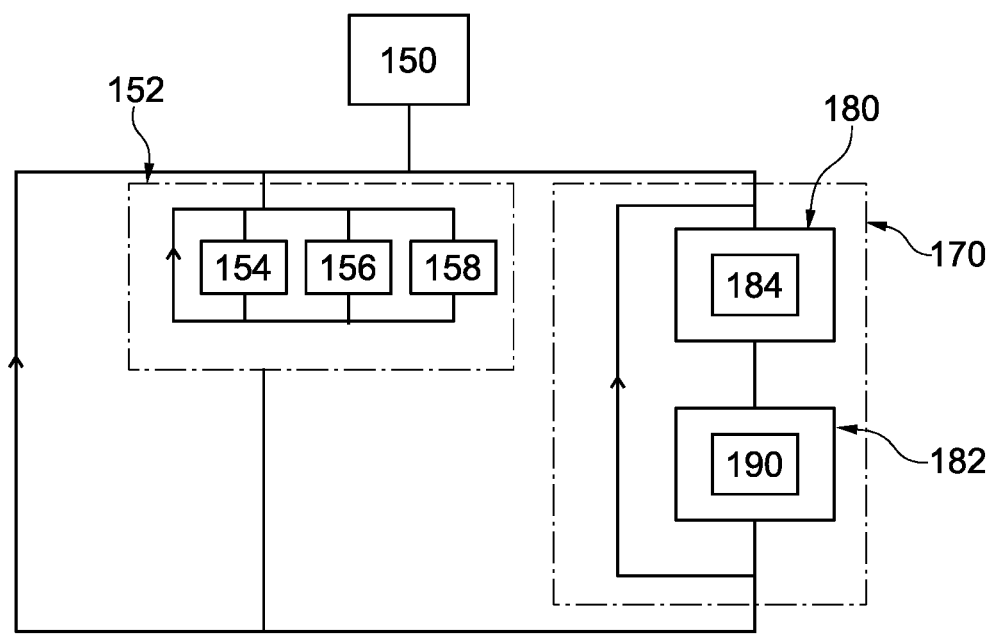
FIG. 6 is a flowchart of a method for executing a secure function, which method is implemented by the apparatus of FIG. 2.

Construction of a dummy instruction on the basis of the opcodes stored in the memory 70 will now be described in more detail with reference to the method of FIG. 6.

Here, the constructor 72 comprises a circuit 74 for selecting an invalid register from the set 12. An "invalid" register is a register of the set 12 to which a dummy write instruction may write without this possibly modifying the result produced by the execution of the secure function. In contrast, a "valid" register is a register that contains a value used by the secure function to produce its result. In other words, a valid register contains a value that is processed by a legitimate instruction. A dummy write instruction cannot write a value to a valid register without running the risk of modifying the result produced by the secure function.

Here, each register of the set 12 is associated with one validity bit $V_{ld}$. This bit takes the value "1" if the register with which it is associated is valid and takes the value "0" in the contrary case.

The circuit 74 automatically and randomly selects, for example on each clock cycle of the microprocessor 2, one invalid register among all of the registers of the set 12. If all the registers of the set 12 to which it is possible to write are valid, then the circuit 74 selects a "dummy" register to which a dummy write instruction may always write without running the risk of modifying the result produced by the secure function. Here, the dummy register is a register of the set 12 to which it is forbidden to write. Thus, execution of a dummy instruction to write to this register does not in any way modify the content of this register. In the case of an ARM architecture, such a register is known as "register R0".

Figure 4:
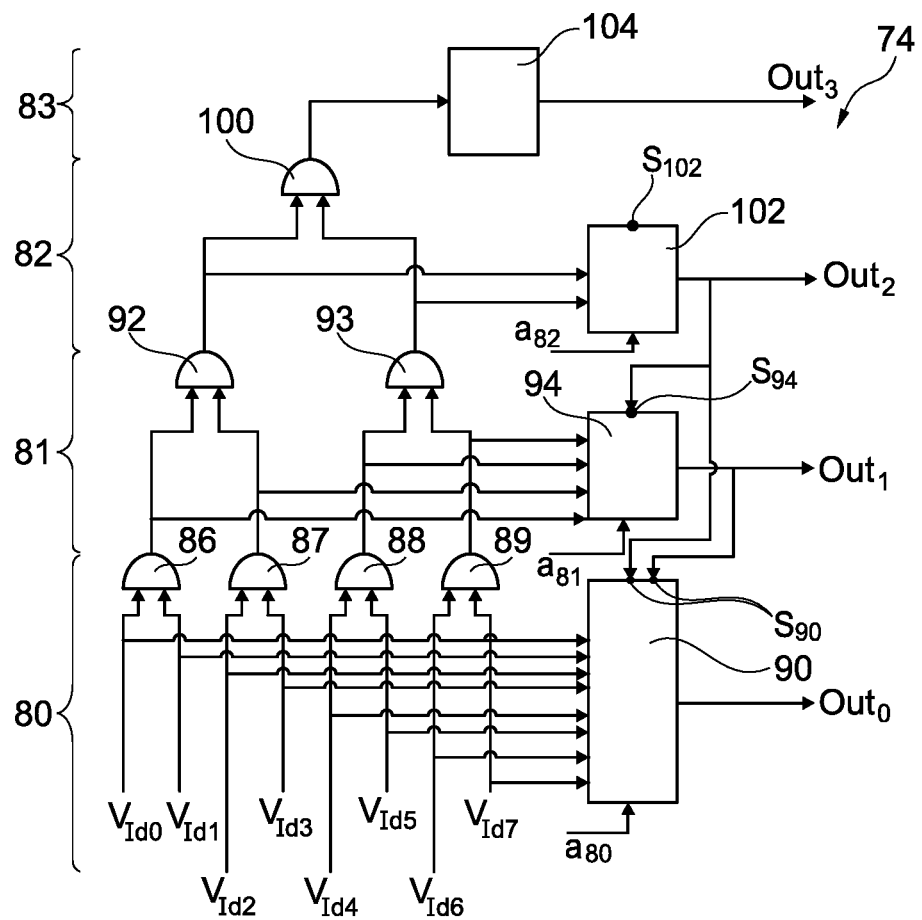
FIG. 4 is a schematic illustration of a circuit for selecting an invalid register implemented in the desynchronization module of FIG. 2.

FIG. 4 shows in more detail one possible embodiment of the circuit 74 for selecting an invalid register. This embodiment is described in the particular case where the circuit 74 receives as input 8 validity bits denoted $V_{ld0}$ to $V_{ld7}$ and random bits $a_{80}$, $a_{81}$ and $a_{82}$. However, the teaching given in this particular case is generalizable to any number of validity bits and therefore to any number of registers.

The circuit 74 comprises four successive stages 80 to 83.

The stage 80 receives the eight validity bits $V_{ld0}$ to $V_{ld7}$ and the random bit $a_{80}$. The stage 80 comprises four logic gates 86 to 89 and a random selector 90. The logic gates 86 to 89 are gates that carry out the logic operation "AND". The two inputs of each of these logic gates 86 to 89 are connected to two respective validity bits, which are identified in FIG. 4 by the references $V_{ld0}$ to $V_{ld7}$. Thus, the output of each gate 86 to 89 takes the value "0" if at least one of the validity bits received as input is equal to "0" and therefore corresponds to an invalid register.

The stage 81 comprises two logic gates 92 and 93 that carry out the logic operation "AND" and a random selector 94. The two inputs of the gate 92 are connected to the outputs of the gates 86 and 87, respectively. The two inputs of the gate 93 are connected to the outputs of the gates 88 and 89, respectively.

Thus, if one of the outputs of the gates 86 and 87 takes the value "0", the output of the gate 92 is equal to "0". When the output of the gate 92 is equal to "0", this means that one of the validity bits $V_{ld0}$ to $V_{ld3}$ is equal to "0". In other words, at least one of the registers associated with this range of validity bits is an invalid register. Gate 93 operates in the same way as gate 92 but for the validity bits $V_{ld4}$ to $V_{ld7}$.

The stage 82 comprises a single logic gate 100 that carries out the logic operation "AND" and a random selector 102. The inputs of the gate 100 are connected to the outputs of the gates 92 and 93, respectively. Thus, if the output of the gate 100 takes the value "0" this means that there is a least one validity bit among the validity bits $V_{ld0}$ to $V_{ld7}$ that is equal to "0". In other words, there is at least one invalid register. In contrast, if the output of the gate 100 is equal to "1", this means that there are no invalid registers among the registers associated with the validity bits $V_{ld0}$ to $V_{ld7}$.

The stage 83 comprises a selector 104 that forces selection of the register R0 when it receives as input a signal equal to "1". Here, its input is connected to the output of the gate 100. The selector 104 comprises an output $Out_4$ that takes the value "1" when its input is equal to "1" and otherwise the value "0".

The selectors 90, 94 and 102 are respectively connected to the inputs of the logic gates of the stage to which they belong. In addition, each selector 90, 94 and 102 comprises:
an input that receives a randomly drawn bit, and
an input that allows the two inputs of a particular logic gate of the same stage to be selected.

Here, the selectors 90, 94 and 102 receive the random bits a80, a81 and a82, respectively.

The inputs of the selectors 90, 94 and 102 that allow the two inputs of a particular logic gate to be selected have been designated with the references $S_{90}$, $S_{92}$ and $S_{102}$, respectively. Here, the input $S_{102}$ systematically selects the two inputs of the gate 100, because there is only a single logic gate in the stage 82.

Each selector 90, 94 and 102 comprises an output, denoted $Out_0$, $Out_1$ and $Out_2$, respectively. Each output of a selector takes either the value "0" or the value "1".

The output $Out_2$ of the selector 102 is connected to the input $S_{94}$. When the output $Out_2$ is equal to "0" the selector 94 selects the inputs of the gate 92. When the output $Out_2$ is equal to "1" the selector 94 selects the inputs of the gate 93.

The outputs $Out_2$ and $Out_1$ are also connected to the input $S_{90}$. The concatenation, in order, of the outputs $Out_2$ and $Out_1$, forms a value, coded on two bits, that is comprised between zero and three. The values zero to three select the logic gates 86 to 89, respectively. Thus, when the input $S_{90}$ receives the value "0", the selector 90 selects the inputs of the gate 86. When the input $S_{90}$ receives the value "1", the selector 90 selects the inputs of gate 87 and so on.

The concatenation, in order, of the outputs $Out_3$ to $Out_0$, forms a value coded on 4 bits and comprised between 0 and 15. The values 0 to 7 correspond to the registers associated with the bits $V_{ld0}$ to $V_{ld7}$, respectively. A value higher than or equal to eight corresponds to the register R0.

Figure 5:
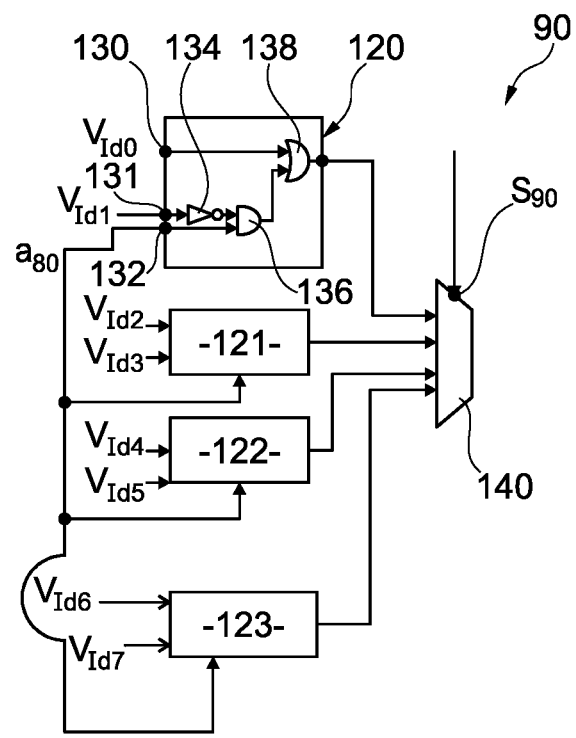
FIG. 5 is a schematic illustration of a random selector implemented in the circuit of FIG. 4.

FIG. 5 shows one embodiment of a random selector in the particular case of the selector 90. The selectors 94 and 102 are constructed and operate in the same way except that the number of inputs of these selectors 94, 102 is adapted to the number of logic gates to which they are connected.

The selector 90 comprises as many selection blocks as there are logic gates in the stage 80. It therefore here comprises four selection blocks 120 to 123. The blocks 120 to 123 are connected to the inputs of the logic gates 86 to 89, respectively, and therefore each to one respective pair of validity bits.

The blocks 120 to 123 are structurally identical to one another. Thus, only the block 120 is described in more detail. The block 120 comprises:
an input 131 connected to the input of the gate 86 that receives the bit $V_{ld0}$,
an input 132 connected to the input of the gate 86 that receives the bit $V_{ld1}$, and
an input 133 that receives, in each clock cycle, the random bit $a_{80}$.

The input 131 is connected to a logic gate 134 that carries out the logic operation "NOT". This logic gate converts a "0" into a "1" and vice versa.

The output of the logic gate 134 and the input 132 are connected to respective inputs of a logic gate 136 that carries out the logic operation "AND". The input 130 and the output of the gate 136 are connected to respective inputs of a logic gate 138 that carries out the logic operation "OR". The output of the gate 138 is connected to one input of a multiplexer 140.

The other inputs of the multiplexer 140 are each connected to one respective output of the blocks 121 to 123. The multiplexer 140 selects the output of one of the blocks 120 to 123 depending on the signal received on the input $S_{90}$.

When the output of the block 120 is equal to "0", this indicates that it is the bit $V_{ld0}$ that is equal to "0". In contrast, when the output of the block 120 is equal to "1", this indicates that it is the bit $V_{ld1}$ that is equal to "0".

The block 120 operates in the following way:
1) When the two inputs 130, 131 are equal to "0", it randomly selects one of the inputs of this logic gate. To do this, its output is set equal to the bit $a_{80}$ received at the same time.
2) When only one of the two inputs 130, 131 is equal to "0", it systematically selects the input that is equal to "0".
3) When the two inputs of the selected logic gate are equal to "1", the output is equal to "1".

Thus, if the input $S_{90}$ selects the gate 86, the output $Out_0$ identifies, among the two inputs of the gate 86, the one that is equal to "0".

Operation of the microprocessor 2 will now be described with reference to the method of FIG. 6 in the particular case of execution of the machine code 32 of a secure function.

Initially, in a phase 150, the machine code is loaded into the memory 4. The machine code 32 is then stored in the memory 4.

The machine code 32 comprises configuration instructions that, when they are executed by the microprocessor 2, adjust the values of the frequency $F_i$ and of the numbers $Nb_L$ and $Nb_i$.

Next, in a phase 152, the legitimate instructions of the machine code 32 are executed by the microprocessor 2. In the phase 152, the loader 18 loads these legitimate instructions one after another.

More precisely, to do this, each legitimate instruction is first loaded by the loader 18. Subsequently, each legitimate instruction is decoded by the decoder 20 and lastly executed by the unit 22. The legitimate instruction loaded is the one located at the address contained in the program counter 26. The value of the program counter 26 is incremented, in each clock cycle, by the unit step except in certain particular cases such as the case of branch instructions.

A branch instruction may either be unconditional or conditional. An unconditional branch instruction systematically provokes, when it is executed by the unit 22, a plurality of legitimate instructions to be skipped. To do this, a new value is written to the program counter 26. This new value corresponds, typically, to an increment or a decrement of a plurality of unit steps.

A conditional branch instruction provokes, when it is executed by the unit 22, a plurality of legitimate instructions to be skipped solely if a condition is met. If this condition is not met, then the program counter is simply incremented by the unit step.

In an operation 154, the microprocessor 2 executes the configuration instructions contained in the machine code 32. This allows the values of the frequency $F_i$ and of the numbers $Nb_L$ and $Nb_i$ to be stored in the internal CSR of the microprocessor 2. For example, to do this, when these instructions are executed, they cause predetermined values of the frequency $F_i$ and of the numbers $Nb_L$ and $Nb_i$ to be stored in the CSR of the microprocessor 2. These predetermined values may be equal to constants set in the machine code 32. These predetermined values may also be computed on the basis of other previously executed instructions of the machine code 32. For example, the machine code 32 comprises instructions that generate a random value coded on 32 bits. Next, the values of the frequency $F_i$ and of the numbers $Nb_L$ and $Nb_i$ are determined on the basis of this random value. Once the values of the frequency $F_i$ and of the numbers $Nb_L$ and $Nb_i$ have been adjusted to a value higher than zero, a temporal-desynchronization phase 170 is executed in parallel with the phase 152.

The temporal-desynchronization phase 170 may also be ended during the execution of the machine code 32. For example, to do this, the machine code 32 comprises instructions to stop the temporal desynchronization. When these stop instructions are executed by the unit 22, this causes the phase 170 to stop. For example, a stop instruction assigns zero values to at least the frequency $F_i$ or to at least one of the numbers $Nb_L$ and $Nb_i$.

In the phase 152, the unit 22 executes legitimate instructions to write a value to a register of the set 12. Each time a legitimate write instruction is executed, in an operation 156, the unit 22 marks this written register as being valid. To do this, the value of the validity bit $V_{ld}$ associated with this register is set to "1".

In contrast, each time the unit 22 executes a legitimate instruction that stores the content of a register of the set 12 in the memory 4, in an operation 158, the unit 22 marks this register as being "invalid". To do this, here, the value of the validity bit associated with this register is set to "0".

More precisely, here, the validity bit of a register is set to "0" solely when the content of this register is stored in the "call stack" or "stack" of the main memory 4. The content of a register is for example written to the call stack each time execution of a first function is interrupted with a view to starting execution of a second function. Once execution of the second function has ended, execution of the first function resumes in the place where it was interrupted. At this point, the content of the registers stored in the call stack are restored to the set 12 of registers, this returning the value of their validity bit to "1". Thus, it is certain that when the content of a register is stored in the call stack, this content will no longer be used until execution of the first function resumes.

In contrast, the register the content of which was stored in the call stack may then be written to throughout the execution of the second function. Thus, the validity bit of this register is equal to "0" from the moment its content is stored in the call stack and until a legitimate instruction of the machine code of the second function writes to this register.

In the temporal-desynchronization phase 170, the module 28 alternates between a passive state 180 and an active state 182.

In the passive state, the module 28 inserts no sequence of dummy instructions between two legitimate instructions. Thus, when the module 28 is in its passive state, the legitimate instructions are executed immediately one after another. When the module 28 is in its passive state, the circuit 54 controls the multiplexer 42 to systematically select the input 44. The output 50 of the multiplexer 42 is equal to "0" to indicate, to the decoder 20, to the unit 22 and to the module 24, that the executed instructions are legitimate instructions.

In the passive state, in an operation 184, the module 28 notes and stores in the memory 70, the opcodes of K executed legitimate instructions. For example, here, the module 28 triggers noting and storage of the opcodes of K successive legitimate instructions on each rising edge of the signal $S_{60}$. The frequency of the signal $S_{60}$ is higher than or equal to the frequency $F_i$. Thus, it is certain that between two successive active states of the module 28, the content of the memory 70 will be systematically renewed.

Only the opcode of each noted legitimate instruction is stored in the memory 70. Thus, the memory 70 does not contain the operands of the noted legitimate instructions.

In the active state 182, the module 28 inserts between two legitimate instructions $IL_{m-1}$ and $IL_m$ a sequence $Seq_k$.

The module 28 switches to its active state if the signal $S_i$ is equal to "1" and, at the same time, the signal $S_p$ is equal to "0". The time at which the signal $S_i$ takes the value "1" is random since it depends on the number rng generated by the generator 62. The signal $S_p$ is equal to "0" only if there is no sequence of dummy instructions already in the process of being inserted between the instructions $IL_{m-1}$ and $IL_m$.

In the active state, in an operation 190, the constructor 72 constructs the sequence $Seq_k$ of dummy instructions and inserts it between the instructions $IL_{m-1}$ and $IL_m$. Here, the constructor 72 constructs the dummy instructions one after another and inserts them between the instructions $IL_{m-1}$ and $IL_m$ as they are constructed.

To construct a dummy instruction, the constructor 72 begins by selecting an opcode from the memory 70. For example, it selects the opcodes stored in the memory 70 in the order in which they were noted.

Next, if the selected opcode is an opcode that must be associated with operands to obtain a dummy instruction the syntax of which is correct, it generates for each operand a value. For example, here, when the selected opcode is different from the opcode of an instruction to write to a register, the value of each operand is generated on the basis of the content of an internal register of the microprocessor 2. The one or more internal registers chosen to do this are, preferably, registers the content of which varies frequently and typically with a frequency equal to or close to the frequency of the clock of the microprocessor 2. For example, the register containing the program counter 26 may be used to this end. This avoids having to generate the value of the operands via a random draw. This also allows values to be obtained for the operands that are different each time a dummy instruction is constructed.

When the selected opcode is the opcode of an instruction that writes to a register of the set 12, one of the operands of this instruction contains the address of the register to be written to. The value of this operand is here generated depending on the register selected by the circuit 74 in order to obtain, each time, for the register to be written to, the address of an invalid register. Thus, subsequently, the dummy write instruction constructed to write to this invalid register may write to this invalid register without this modifying the operation or the result produced by the secure function.

Once the opcode has been selected and the values of the various operands generated, these elements are concatenated one after another to form a dummy instruction the syntax of which is correct.

The dummy instruction thus constructed is then sent to the input 46 of the multiplexer 42. As soon as said instruction is transmitted to the decoder 20, the constructor 72 constructs the following dummy instruction.

Each time the input 46 is selected, the identifier of dummy instructions delivered on the output 50 takes the value "1". In contrast, the identifier of dummy instructions delivered on the output 50 takes the value "0" when the input 44 is selected.

Here, the constructor 72 selects $Nb_i$ successive opcodes from the memory 70. Next, it constructs a subsequence of $Nb_i$ dummy instructions on the basis of the $Nb_i$ selected opcodes. Then, it reiterates this construction of a subsequence of $Nb_i$ dummy instructions $Nb_L$ times. Thus, the sequence $Seq_k$ inserted between the instructions $L_{m-1}$ and $IL_m$ comprises $Nb_L$ times $Nb_i$ dummy instructions.

Until the construction and the insertion of all the dummy instructions of the sequence ends, the constructor 72 keeps the signal $S_p$ equal to "1". In contrast, once the insertion of the sequence of dummy instructions has ended, the value of this signal $S_p$ is returned to "0".

In the next clock cycle, the constructed dummy instruction present on the input 46 is decoded by the decoder 20 then, in the following clock cycle, executed by the unit 22.

When the executed dummy instruction is a dummy instruction to write to a register of the set 12, the unit 22 executes this instruction and writes a value to the invalid register the address of which is contained in this dummy write instruction. However, the validity bit of the register written to remains equal to "0". When the executed dummy instruction is a dummy instruction that causes, when it is executed, a register that is not associated with a validity bit or the memory 4 to be written to and the dummy-instruction identifier is equal to "1", the unit 22 systematically inhibits this write operation.

SECTION III—VARIANTS

Variants of the Selection of an Invalid Register:

Selection of an invalid register to construct a dummy instruction to write to a register may be omitted. In this case, for example, the unit 22 systematically inhibits writing to a register of the set 12 when the dummy-instruction identifier is equal to "1". In such an embodiment, the circuit 74 may then be omitted.

In another embodiment, the instructions to write to a register or to a memory are not noted and stored in the memory 70. In this case also, the circuit 74 may be omitted since no dummy instruction to write to a register or to a memory is generated by the module 28. In addition, use of the dummy-instruction identifier may also be omitted in this case.

The circuit 74 for selecting an invalid register may also be implemented at the input of the set 12 of registers to systematically select an invalid register when the dummy-instruction identifier is equal to "1". In this case, when the constructor 72 constructs a dummy instruction to write to one of the registers of the set 12, the values of the operands designating the register to be written, take a predetermined or randomly chosen value. However, at the moment of writing, the circuit 74 automatically selects an invalid register and not the register corresponding to the operand of the executed dummy write instruction. When the dummy-instruction identifier is equal to "0", the circuit 74 is inactive. In this case, the register to which a datum is written in response to the execution of a legitimate write instruction is the register designated by the operand of this legitimate instruction.

As a variant, the validity bit $V_{ld0}$ is associated with the register R0 of the microprocessor 2. The bit $V_{ld0}$ is then always equal to "0" since this register R0 cannot be written to. In this case, the stage 83 of the circuit 74 is omitted since there is always at least one validity bit equal to "0".

There are other methods for associating a validity bit with registers. For example, the validity bit associated with each register is stored in an associative array.

Variants of the Noting and Selection of Opcodes:

In another embodiment, the temporal-desynchronization module 28 does not note at regular intervals the opcodes of the executed legitimate instructions. For example, the module 28 notes the opcodes of the legitimate instructions only after having received a signal triggering insertion of a sequence of dummy instructions. In the latter case, the module 28 notes, in response to this signal, $Nb_i$ opcodes then constructs the sequence of dummy instructions to be inserted on the basis of these noted opcodes. Thus, opcodes are noted only as required.

The order of the dummy instructions in the sequence of dummy instructions is not necessarily the same as the order in which the opcodes are noted. For example, in variants, the constructor 72 randomly selects, from the memory 70, the opcode to be used to construct a dummy instruction. In another embodiment, instead of selecting them randomly, it may also simply select one in two thereof or apply any other selection logic determined in advance.

In variants, in addition to the dummy instructions constructed on the basis of the noted opcodes, the module 28 generates additional dummy instructions without using the noted opcodes. For example, the opcode of these additional dummy instructions is selected randomly or cyclically from a predetermined set of possible opcodes.

In another embodiment, the module 28 does not necessarily note the opcodes of all of a series of immediately consecutive legitimate instructions. For example, the module 28 notes only one opcode in two or one opcode in three of this series of consecutive legitimate instructions.

It will be noted that the opcodes noted then used to construct the dummy instructions are not necessarily the opcodes of the legitimate instructions located immediately before the legitimate instruction $IL_m$. For example, the instruction $IL_{m-1}$ is not used to construct the dummy instructions of a sequence inserted immediately before the instruction $IL_m$.

The case where the number K of opcodes storable in the memory 70 and the numbers $Nb_L$ and $Nb_i$ are all equal to one, is one advantageous embodiment because it makes it even more difficult to detect a sequence $Seq_k$.

As a variant, in the operation 184, in addition to noting the opcodes of the executed legitimate instructions, the module 28 notes some or all of the operands of these legitimate instructions. Subsequently, these noted operands are, for example, used to construct the dummy instructions.

Other Variants:

As a variant, the values of the operands of the dummy instructions are generated by random drawing.

The temporal-desynchronization method described here may also be implemented in software form. For example, instructions that carry out the same operations as those of the module 28 are inserted into the machine code 32 and it is the execution of these instructions, by the microprocessor 2, that executes the method of FIG. 6. In the context of a software implementation of the temporal-desynchronization module 28, the dummy instructions may be generated at the time of compilation of the machine code and not necessarily at the time at which this machine code is executed.

The various embodiments described here may be combined together.

Section IV: Advantages of the Described Embodiments

Constructing the dummy instructions on the basis of the opcodes of the legitimate instructions executed beforehand allows dummy instructions that are similar to legitimate instructions to be obtained. This makes identification of these dummy instructions more difficult since they necessarily resemble legitimate instructions of the secure function. In addition, this simplifies the generation of the dummy instructions with respect to the case where the latter are constructed completely randomly. Specifically, in the latter case, it is necessary to randomly draw the opcodes of the dummy instructions.

The fact that the operands of the constructed dummy instructions are different from the operands of the legitimate instructions on the basis of which they were constructed, allows leakage of confidential information to be made more difficult. Specifically, executing a dummy instruction does not re-expose an operand to an attempt at attack.

The random choice of the legitimate instructions noted to construct the dummy instructions makes the identification of these dummy instructions during the execution of the secure function more difficult. Specifically, under these conditions, the constructed dummy instructions change from one execution to the next of the secure function.

Noting at regular intervals the opcodes of the executed legitimate instructions then using only the latest noted opcodes to construct the dummy instructions allows the noted opcodes to be chosen randomly in a simple manner. Specifically, after execution of the first sequence $Seq_1$, the times at which the legitimate instructions are executed are temporally desynchronized with respect to the start of the execution of the secure function. Thus, at the end of each regular interval, the opcodes of the noted legitimate instructions differ from one execution to the next of the secure function.

Continuously marking, during the execution of the secure function, registers that are invalid, allows them to be used to construct dummy write instructions. Thus, the constructed dummy write instructions use the same registers as legitimate instructions, i.e. registers that will possibly have been used before or that will possibly be used subsequently by legitimate instructions. It is therefore not necessary to reserve registers of the microprocessor for use by these dummy write instructions. In other words, there are no registers reserved exclusively for use by dummy write instructions. In addition, this makes detection of the dummy write instructions more difficult because they use the same registers as the legitimate instructions during the same execution of the secure function.

The invention claimed is:

1. A method for executing a function, secured by temporal desynchronization, said function being executed by a microprocessor, said method comprising:
   loading, one after another, legitimate instructions of the function, the legitimate instructions determining a result produced by the function,
   executing, with an arithmetic logic unit of the microprocessor, the legitimate instructions loaded one after another, in an order in which the legitimate instructions are loaded,
   randomly triggering insertion of a sequence of dummy instructions after a first legitimate instruction and immediately before a second legitimate instruction, and
   executing, with the arithmetic logic unit, the sequence of dummy instructions, wherein said execution of said sequence of dummy instructions:
      delays a time at which the second legitimate instruction is executed with respect to a time at which the first legitimate instruction is executed, and
      has no influence on the execution of the legitimate instructions, and therefore has no influence on the result produced by the function, and
   wherein the method further comprises:
      when the first legitimate instruction is loaded, noting an opcode of said first legitimate instruction,
      constructing a certain dummy instruction based on said noted opcode, the constructed dummy instruction being identical to the first legitimate instruction except with different operands, and
      incorporating the constructed dummy instruction into the sequence of dummy instructions used to delay the time at which the second legitimate instruction is executed.

2. The method according to claim 1, wherein the first legitimate instruction, the opcode of which is noted, is randomly chosen from those legitimate instructions executed before the second legitimate instruction.

3. The method according to claim 2, wherein the method further comprises:
   noting, at regular intervals, a loaded legitimate instruction of the legitimate instructions, and
   when the insertion of a sequence of dummy instructions is triggered, using a last noted legitimate instruction as the first legitimate instruction used to construct the certain dummy instruction of said sequence of inserted dummy instructions.

4. The method according to claim 1, wherein the method further comprises:
   during execution, by the arithmetic logic unit, of a particular legitimate instruction that writes a value to a first register of the microprocessor, marking the first register as being "valid", and
   during storage of a content of a second register of the microprocessor in a main memory, marking the second register as being "invalid", and
   during construction of the certain dummy instruction, when the noted opcode corresponds to a particular opcode of an instruction to write to a register of the microprocessor, a particular operand of said particular opcode that contains a register address to be written to is set equal to an address of a particular register of the registers currently marked as being "invalid," in order to obtain the certain dummy instruction to write to the particular register marked as being "invalid", and
   in response to the execution of said constructed dummy instruction, the arithmetic logic unit writes a value to the particular register.

5. The method according to claim 4, wherein only storage of the content of the second register of the microprocessor in a call stack of the main memory causes the second register to be marked as being "invalid".

6. The method according to claim 1, wherein:
   during execution of the sequence of dummy instructions, each time a particular dummy instruction to be executed by the arithmetic logic unit is a dummy instruction to write to a particular register or a particular memory containing data that influences the result produced by the function, an indicator signals to the arithmetic logic unit that the particular dummy instruction being executed is a dummy write instruction, and in response, the arithmetic logic unit inhibits writing to the particular register or the particular memory containing the data that influences the result produced by the function.

7. A microprocessor, comprising:

a loader configured to load, one after another, legitimate instructions of a function, the legitimate instructions determining a result produced by the function, an arithmetic logic unit configured to execute the legitimate instructions loaded one after another, in an order in which the legitimate instructions are loaded, and a hardware temporal-desynchronization circuit configured to randomly trigger insertion of a sequence of dummy instructions after a first legitimate instruction and immediately before a second legitimate instruction, said sequence of dummy instructions being configured so that, execution of the sequence of dummy instructions by the arithmetic logic unit:

delays a time at which the second legitimate instruction is executed with respect to a time at which the first legitimate instruction is executed, and has no influence on the execution of the legitimate instructions, and therefore no influence on the result produced by the function, wherein the hardware temporal-desynchronization circuit is further configured to:

when the first legitimate instruction is loaded, note an opcode of said first legitimate instruction, construct a certain dummy instruction based on said noted opcode, the constructed dummy instruction being identical to the first legitimate instruction except with different operands, and incorporate the constructed dummy instruction into the sequence of dummy instructions used to delay the time at which the second legitimate instruction is executed.

* * * * *